UNITED STATES PATENT OFFICE.

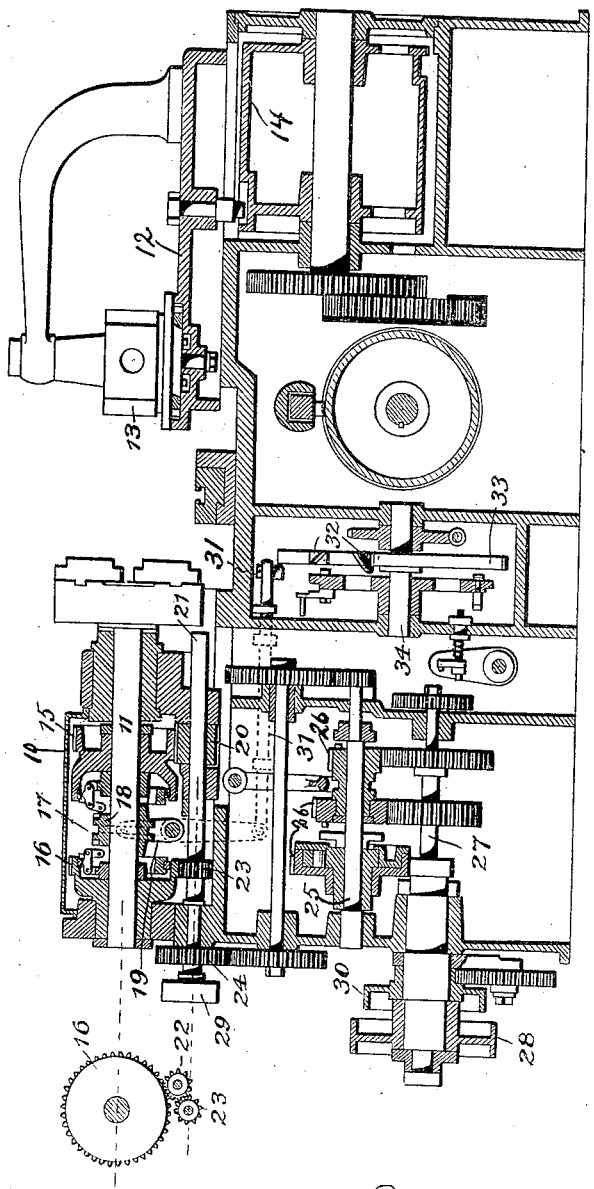

JAMES C. POTTER, OF PAWTUCKET, RHODE ISLAND.

SCREW-MACHINE.

1,136,719.  Specification of Letters Patent.  Patented Apr. 20, 1915.

Application filed September 14, 1909. Serial No. 517,696.

*To all whom it may concern:*

Be it known that I, JAMES C. POTTER, of Pawtucket, in the county of Providence, and in the State of Rhode Island, have invented a certain new and useful Improvement in Screw-Machines, and do hereby declare that the following is a full, clear, and exact description thereof.

The object of my invention is to enable the use of solid taps and dies in automatic screw machines, and to this end my invention consists in the screw machine constructed substantially as hereinafter specified and claimed.

Referring to the drawings, the figure shows a longitudinal section of an automatic screw machine embodying my invention.

The machine illustrated in the drawings as embodying my invention comprises a head stock 10, having a chuck-carrying spindle 11, a slide 12 carrying a tool turret 13, the slide being reciprocable toward and from the chuck by a cam drum 14, in a manner well understood in this art.

Loose upon the head stock spindle are two spur gears 15 and 16, respectively, which may be alternately clutched to the spindle as by means of a friction clutch 17, such, for example, as that which forms the subject of patent of Potter & Johnston Machine Co., issued March 23, 1909, which includes a sliding collar 18 splined to the shaft, and having an operating lever 19. The spur gears 15 and 16, revolve in opposite directions so that one rotates the spindle in one direction and the other in the opposite direction, the gear 15 being in mesh with a pinion 20 on a shaft 21 extending parallel with the spindle, and the gear 16 being in mesh with an intermediate or idler pinion 22 that meshes with a pinion 23 also on said shaft 21. The shaft 21 has upon it a gear 24 which through a suitable train of gears, including a shaft 25 with several—as shown, three—gears 26 adapted one at a time to be clutched to the shaft 25, receives power from a main shaft 27, and thereby imparts a variable speed to the spindle. The main shaft 27 has a band wheel 28 which is belted to a counter shaft. The speed of revolution of the turret slide moving drum is also variable, and in order to have the change of speed of spindle and tool take place in right relation, the turrent slide moving cam drum and the spindle are geared or connected together, this being accomplished in the case of the machine shown in the drawings, by providing the shaft 21 with a band wheel or pulley 29 that is connected by a belt with a pulley or band wheel 30 and journaled concentric with and to turn independent of the main shaft, and which through suitable gearing, not necessary to be described, transmits power to the turret actuating cam drum. In cutting thread, whether by means of a tap or die, the spindle is revolved in one direction during a thread cutting operation, and in the opposite direction for the retraction from the work of the thread cutting tap or die, and the rate or speed of revolution of the spindle should be in proper proportion to the rate of rearward travel of the turret slide, so that disconnection of the thread cutting tool and the work may take place without injury to the work, and enabling the employment of a solid tap or die for cutting the thread.

In order to render the reversal of revolution of the spindle automatic, and to cause it to take place upon the completion of the threading operation, I pivot to the clutch operating lever 19 one end of a rod or bar 31, whose other end is in the path of one or more cam lugs 32 clamped to a wheel 33 on a shaft 34 that through suitable connection receives motion from the main driving shaft. Certain of the cam lugs act to move the clutch operating lever in one direction, and others in the opposite direction, so that the time and direction of revolution of the spindle are automatically controlled.

It will be seen that by the employment of the shaft 21, I am able to obtain the important advantage of gearing together the head stock spindle and the turret slide, so as to secure the changes of speed of spindle and tools in the proper relation, because said shaft 21 supplies power to the spindle and to the turret slide cam drum, and also am able to reverse the direction of revolution of the spindle. Were there a direct connection between the head stock spindle and the turret slide cam drum revolving mechanism, and were there a direct connection between the gears and the spindle for revolving the latter at different speeds, the reversal of the revolution of the spindle would be impossible, since it would involve a reversal of all the mechanism which would thus be directly connected with the spindle.

Having thus described my invention, what I claim is—

The combination of a work spindle, a tool carrier reciprocable toward and from the work, a variable speed shaft separate from the spindle, two driving connections between said shaft and said spindle, that respectively revolve the same in opposite directions including clutch devices mounted on the spindle, means acting on said clutch devices to render said driving connections effective at different times, tool carrier moving means, and gearing between said variable speed shaft and said tool carrier moving means the direction of revolution of the members of said gearing not being changed when the direction of revolution of the spindle is reversed, said gearing receiving its motion independently of the spindle.

In testimony that I claim the foregoing I have hereunto set my hand.

JAMES C. POTTER.

Witnesses:
W. WALLACE POTTER,
ELVERY LINGARD.

Copies of this patent may be obtained for five cents each, by addressing the "Commissioner of Patents, Washington, D. C."